United States Patent
Schmitt (10) Patent No.: US 6,851,171 B2
(45) Date of Patent: Feb. 8, 2005

(54) METHOD OF FABRICATING MULTI-CHANNEL DEVICES AND MULTI-CHANNEL DEVICES THEREFROM

(75) Inventor: Stephen C. Schmitt, Dublin, OH (US)

(73) Assignee: Battelle Memorial Institute, Columbus, OH (US)

(*) Notice: Subject to any disclaimer, the term of this patent is extended or adjusted under 35 U.S.C. 154(b) by 0 days.

(21) Appl. No.: 10/306,098

(22) Filed: Nov. 27, 2002

(65) Prior Publication Data

US 2004/0098854 A1 May 27, 2004

(51) Int. Cl.⁷ .............................. B23P 21/00; F28F 3/00
(52) U.S. Cl. .............. 29/469; 29/890.035; 29/890.054; 165/166; 165/167
(58) Field of Search ............................ 29/469, 890.03, 29/890.035, 890.052, 890.054; 165/165, 166, 167

(56) References Cited

U.S. PATENT DOCUMENTS

| | | | |
|---|---|---|---|
| 2,917,292 A | * 12/1959 | Hittrich | 261/7 |
| 2,961,222 A | * 11/1960 | Butt | 165/166 |
| 3,148,038 A | 9/1964 | Wolfe | |
| 3,176,763 A | 4/1965 | Frohlich | |
| 3,454,082 A | * 7/1969 | Harke | 165/166 |
| 4,183,403 A | 1/1980 | Nicholson | |
| 4,516,632 A | 5/1985 | Swift et al. | |
| 4,606,495 A | * 8/1986 | Stewart et al. | 228/183 |
| 4,651,811 A | 3/1987 | Frauenfeld et al. | |
| 5,205,037 A | * 4/1993 | Kuriki | 29/890.038 |
| 5,271,459 A | 12/1993 | Daschmann | |
| 5,317,805 A | 6/1994 | Hoopman et al. | |
| 5,811,062 A | 9/1998 | Wegeng et al. | |
| 5,845,399 A | * 12/1998 | Dewar et al. | 29/890.03 |
| 6,052,899 A | * 4/2000 | Inaba | 29/890.043 |
| 6,082,140 A | 7/2000 | Ackler et al. | |
| 6,134,785 A | * 10/2000 | Walter et al. | 29/890.054 |
| 6,216,343 B1 | 4/2001 | Leland et al. | |
| 6,220,497 B1 | 4/2001 | Benz et al. | |
| 6,332,568 B1 | 12/2001 | Christenson | |
| 6,467,535 B1 | 10/2002 | Shembekar et al. | |
| 6,684,943 B2 | * 2/2004 | Dobbs et al. | 165/166 |
| 2002/0036079 A1 | * 3/2002 | Morel et al. | 165/166 |
| 2002/0080563 A1 | 6/2002 | Pence et al. | |
| 2004/0118554 A1 | * 6/2004 | Dobbs et al. | 165/166 |
| 2004/0140085 A1 | * 7/2004 | Dobbs et al. | 165/166 |

FOREIGN PATENT DOCUMENTS

| | | | | |
|---|---|---|---|---|
| JP | 61153396 A | * 7/1986 | | F28F/3/06 |
| JP | 61161397 A | * 7/1986 | | F28F/3/06 |
| JP | 61175487 A | * 8/1986 | | F28F/3/06 |
| JP | 04353394 A | * 12/1992 | | F28F/3/08 |
| JP | 05157480 A | * 6/1993 | | F28F/3/06 |
| WO | WO 01/95237 A2 | 12/2001 | | |

* cited by examiner

*Primary Examiner*—Essama Omgba
(74) *Attorney, Agent, or Firm*—William B. Richards (57) ABSTRACT

A multi-channel device fabrication process and multi-channel devices made therefrom wherein two ribbons of sheet material edge webs and, optionally, additional webs and/or support members are secured to a ribbon of sheet material base web. The resulting partial laminate is separated into subassemblies, each subassembly comprising a base and two edge strips and, optionally, additional strips which cooperate to define a plurality of open channels with, optionally, support members. A plurality of subassemblies may stacked together with an end plate to form a complete stack, the edges of each subassembly being attached together to form a complete unit. One or more headers or manifolds may be attached to the outside of the complete unit to provide combined fluid inlet to, and egress from, the unit.

21 Claims, 6 Drawing Sheets

METHOD OF FABRICATING MULTI-CHANNEL DEVICES AND MULTI-CHANNEL DEVICES THEREFROM

The invention was not made by an agency of the United States Government nor under contract with an agency of the United States Government.

FIELD OF THE INVENTION

The present invention relates to a method of fabricating multi-channel devices and multi-channel devices made therefrom. In particular, multi-channel devices in which channel groups are arranged in a cross-flow design. Such devices may include, for example, chemical reactors, heat exchangers, and combinations thereof. Additional applications include other chemical unit operations such as vaporization, condensation, and distillation. In each case, fluids or fluid-like streams, e.g., gases, liquids, fluidized solids, suspended solids, or combinations thereof, flow through the channels.

BACKGROUND OF THE INVENTION

Multi-channel devices have particular use in the field of chemical unit operations. For example, a plurality of channels can enable improved pressure containment and flow distribution when compared with a single channel capable of handling the same flow and can also provide greater surface area per unit volume. Examples of the most basic multi-channel devices include the well-known shell-and-tube heat exchanger and the plate-fin heat exchanger. In both exchangers, the flow of at least one fluid is distributed to a number of channels as it progresses through the unit. In the heat exchange environment, this increases heat transfer efficiency by increasing the surface area to which a given flowing fluid is exposed. Similarly, multi-channel configurations enable improved flow distribution and catalyst contact features in a reaction environment. It is also known that smaller and more compact devices can offer significant benefits such as improved thermal efficiency and faster reaction times. Most such devices have a smaller footprint with effectiveness measures comparable or superior to large-scale units. In addition, when employed as reactors, such devices often provide improved performance, both in terms of conversion of reactants to products and in terms of selectivity to desired products relative to undesired products. When employed as heat exchangers, such devices often provide improved heat transfer parameters.

Fabricating smaller and more compact multi-channel devices to meet economic constraints can be particularly difficult, especially when numerous small channels are required and the channels are in close proximity to one another. This is especially important when attempting to combine a multitude of small, compact devices to provide throughput comparable to large-scale units. Current fabrication methods for metals, for example, include, first, using wire electro-discharge machining (EDM) techniques to fabricate small multi-channel devices from solid blocks. In wire EDM, each channel is cut out by first forming a starter hole through the block. Then, each channel is cut to size by slowly moving the wire along what will become the walls of the channel. The material cut out is then scrap. While useful for forming relatively deep, narrow channels in solid material and minimizing assembly and alignment issues, wire EDM, compared to other techniques, is significantly more expensive. In addition, some practical limitations exist on channel lengths and fabrication time can be lengthy. Another method uses diffusion bonding of stacks of shims which have been stamped or cut out to define the multiple channels. In the first instance, stamping generates more waste material than other processes. Additionally, the diffusion bonding method requires that the channels be closed during bonding to avoid unsupported areas and then machined open after bonding. The bonding process itself also requires extensive tooling and expensive capital equipment. Following machining, cleaning steps are required to remove chips and cleaning coolant/lubricant. This all adds up to a process that is relatively expensive. Extrusion forms channels that require finish machining to reach desired levels of precision, thus adding to the cost. In addition, extrusion cannot be used on all materials—high temperature alloys, for example, are not good candidates—and there are limits on minimum channel size. Casting also suffers from some of the same limitations. Finally, etch techniques are not cost-competitive, particularly with high-temperature alloys.

A welded, or otherwise joined, stack approach as described herein represents a practical lower cost approach to fabricating such multi-channel devices.

BRIEF DESCRIPTION OF THE INVENTION

It is an object of the invention to provide lower-cost multi-channel devices using improved fabrication methods. More particularly, in a preferred embodiment, the invention relates to a continuous, or semi-continuous, fabrication process wherein two ribbons of sheet material edge webs and, optionally, additional webs and/or support members are welded or otherwise attached to a ribbon of sheet material base web. The resulting partial laminate is then separated into subassemblies, each subassembly comprising a base and two edge strips and, optionally, additional strips which cooperate to define a plurality of open channels with, optionally, support members. The subassemblies, depending upon the desired application, may be configured in an almost infinite variety of designs. Subsequently, a plurality of subassemblies is stacked together with an end plate to form a complete stack, the edges of each subassembly being welded or otherwise attached together to form a complete unit. By welding, or otherwise attaching, one or a limited number of subassemblies together at a time, the problem of unsupported areas is avoided because minimal pressure is placed on the subassembly as it is secured to the stack. Lower pressure translates into lower-cost equipment and more precise final dimensions due to reduced deformation. This allows subassemblies to be fabricated in the final shape, minimizing machining and waste material. In particular, there should be little or no machining of the channel openings prior to attaching manifolds or headers.

As desired, one or more headers or manifolds may be attached to the outside of the complete unit to provide combined fluid inlet to, and egress from, the unit.

Other objects, advantages, and novel features of the present invention will become apparent from the following detailed description of the invention when considered in conjunction with the accompanying drawings.

DETAILED DESCRIPTION OF THE INVENTION AND BEST MODE

Figure 1:
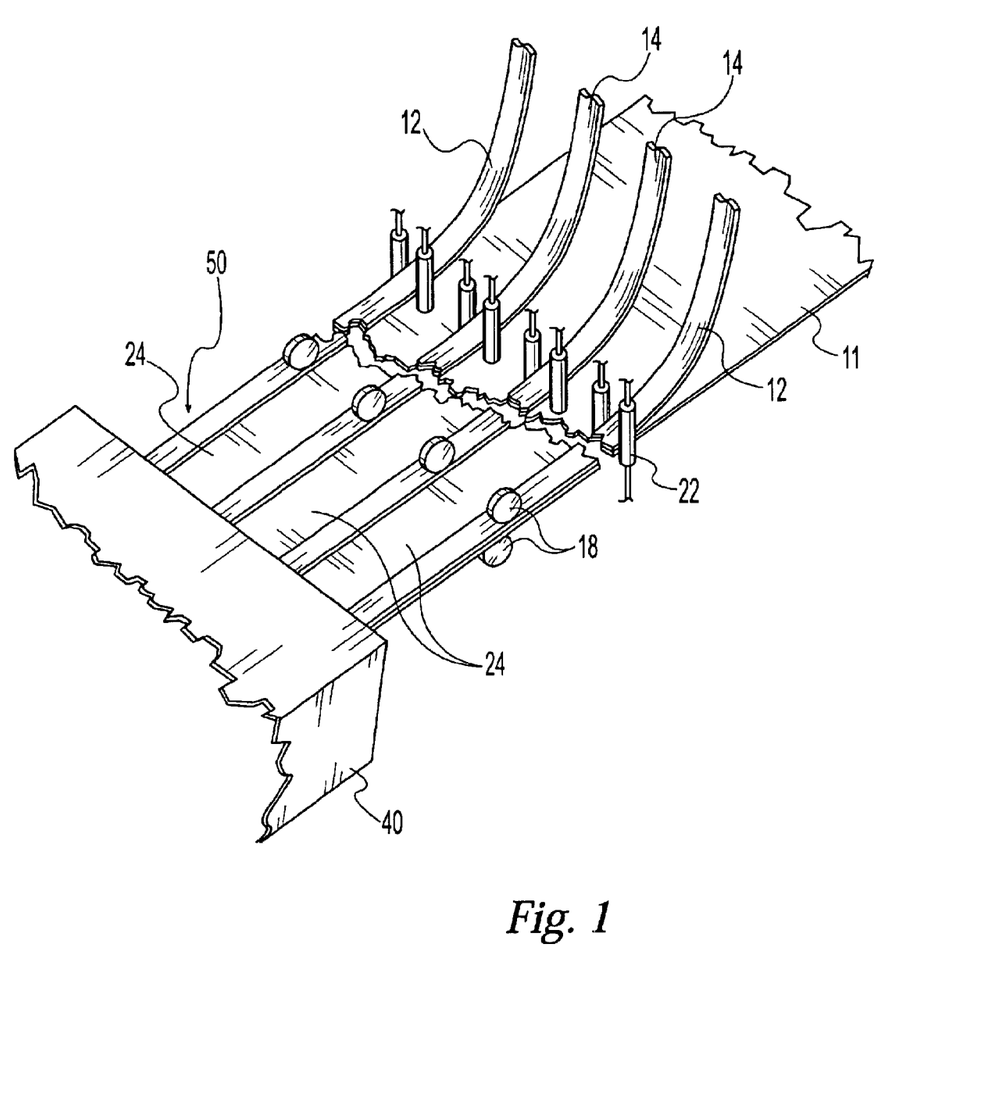
FIG. 1 is a perspective view of the aligning, web securing, and cutting aspects of a preferred embodiment of the present invention.
Figure 8:
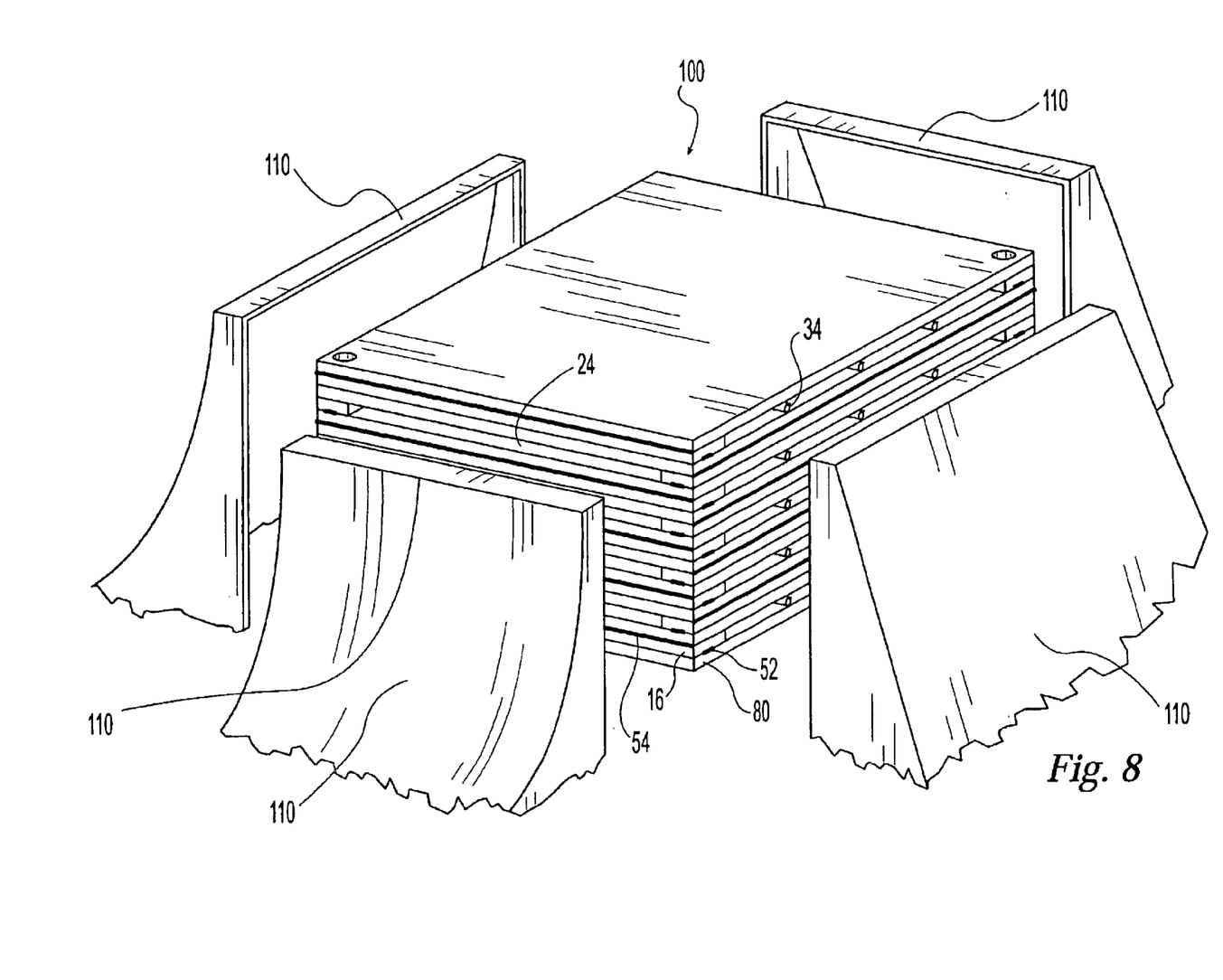
FIG. 8 is a partially-exploded perspective view of a complete unit fabricated according to a further embodiment of the present invention.
Figure 9:
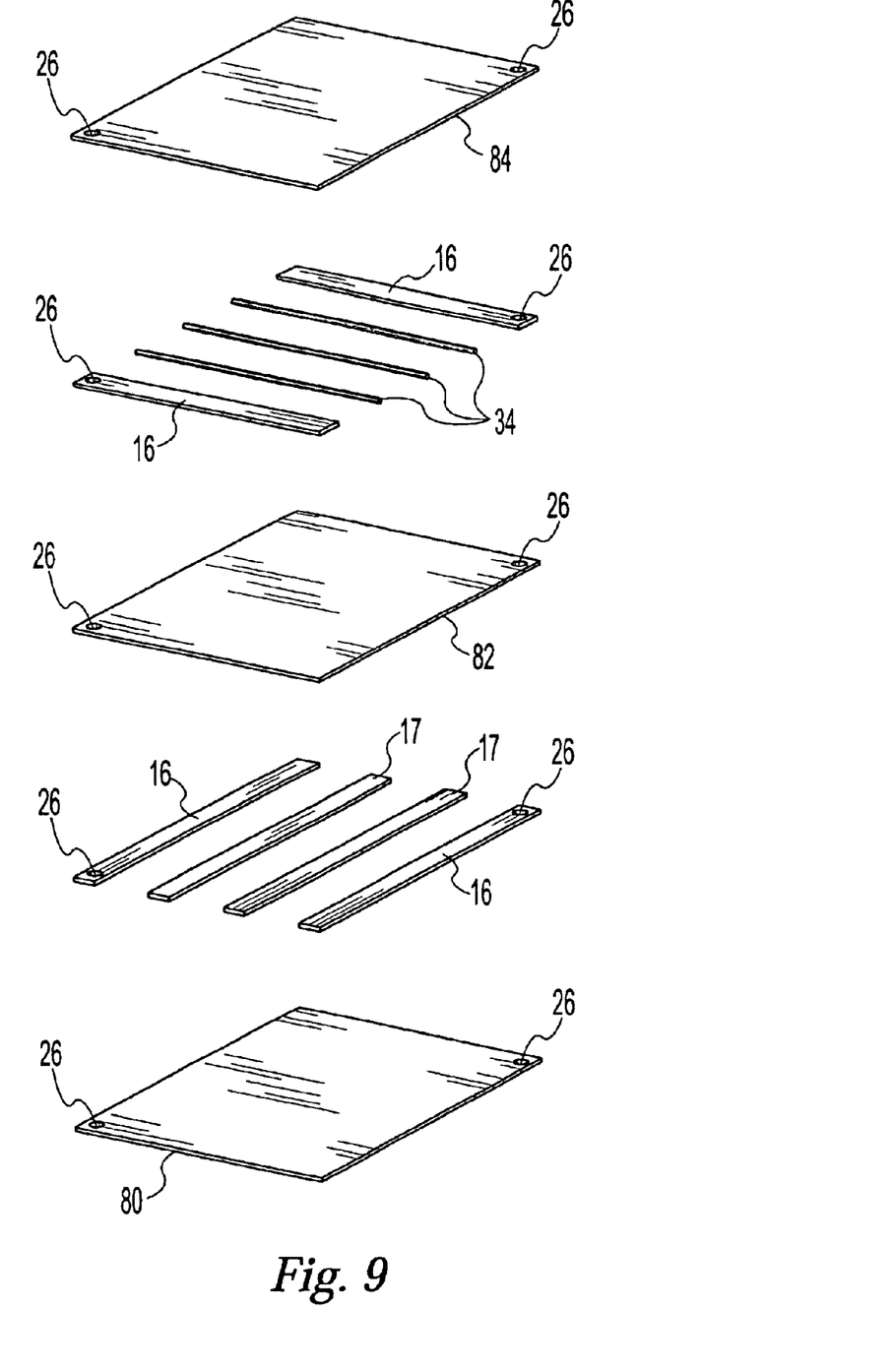
FIG. 9 is an exploded perspective view of a stack according to the present invention.

FIG. 1 shows a first step in fabricating the typical subassembly 10, 20, 60 (FIGS. 3, 4, and 5, respectively) for eventual inclusion in a completed stack 100 (FIG. 8). Beginning with a feed of the desired metals, plastics, ceramics, or other suitable materials of construction, the main components of the typical subassembly 10 (FIG. 3), the base web 11 and at least two edge webs 12, are fed together while being guided and aligned. As it is desirable to adapt the present invention to a continuous high-speed process, coil-fed operations, well-known to those of ordinary skill in the art, may be employed with certain materials such as metals and plastics. Alternatively, any desired length of metal or other material may be fed by other well-known methods. While a standard alignment method using alignment rollers 22 is shown, it will be appreciated by one skilled in the art, that other alignment methods could be utilized with equal success. Alignment plates, for example, could be employed but, as one skilled in the art will appreciate, rolling elements are generally required to avoid excessive wear. Alignment rollers 22 may, of course, be of many possible shapes and materials to suit the needs of the particular operation. As will be appreciated by one skilled in the art, the edge webs 12 need not be aligned flush with an edge of the base web 11. Optionally, and as illustrated in FIG. 1, additional webs 14 may be included to form additional channels 24, thus forming another typical subassembly 20 (FIG. 4). The number of additional webs 14 as well as their width and spacing can be varied widely to meet the design criteria of the final device.

Figure 3:
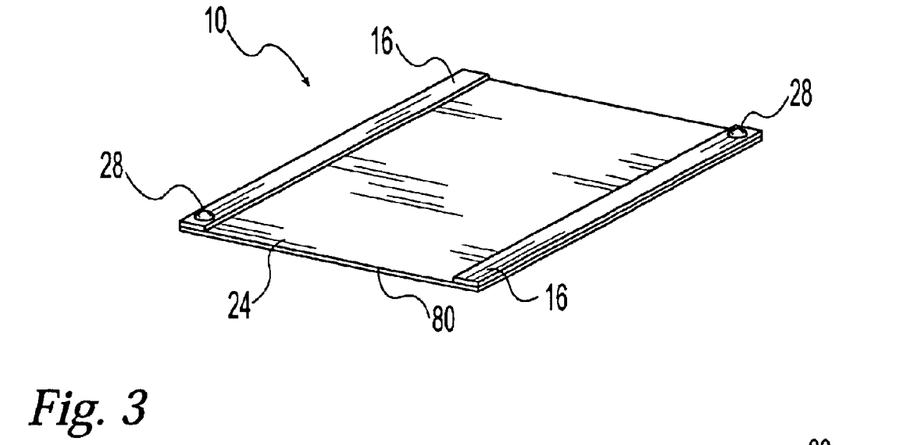
FIG. 3 is a perspective view of a subassembly fabricated according to the present invention.
Figure 4:
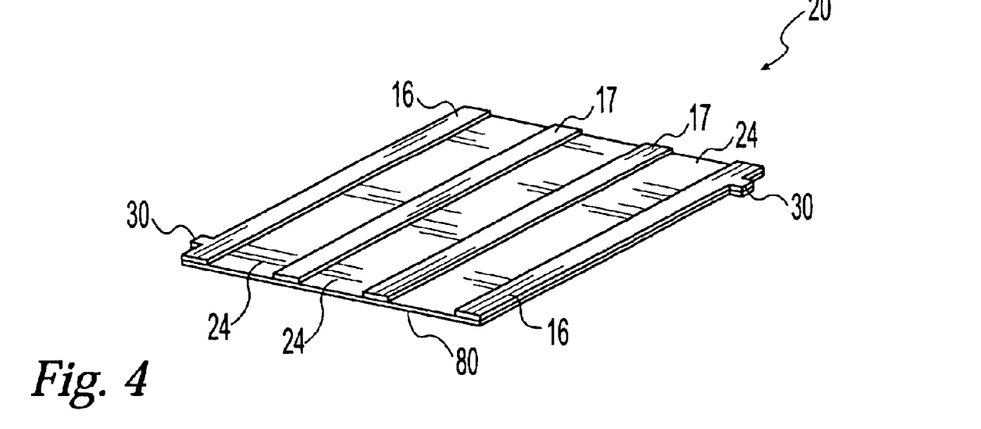
FIG. 4 is a perspective view of a subassembly fabricated according to a further embodiment of the present invention.
Figure 5:
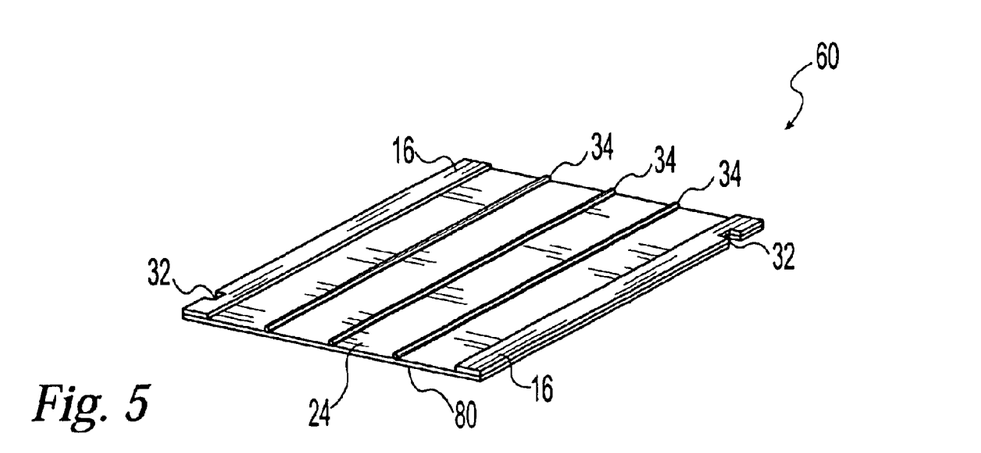
FIG. 5 is a perspective view of a subassembly fabricated according to a further embodiment of the present invention.

Alternative channel 24 designs, by way of example only, are shown in FIGS. 3–5. FIG. 3 shows edge strips 16 which cooperate with a base 80 to form a channel 24. In like manner, FIG. 4 shows a plurality of optional additional strips 17 cooperating with edge strips 16 and a base 80 to form three channels 24. Finally, FIG. 5 shows a plurality of support members 34. As will be appreciated by those skilled in the art, the use and placement of support members 34 will depend upon several design and fabrication factors, principally the necessity of minimizing the effects of pressure differentials during fabrication or normal use.

Following alignment, as shown in FIG. 1, the edge webs 12 and any optional additional webs 14 are secured to the base web 11 creating a partial laminate 50. A preferred method for metals, for example, is continuous electric seam welding which enjoys the advantages of high speed and adaptability to high volume manufacturing with relatively low capital investment. Additionally, support members 34 may be installed in any channel 24. In such case, the support members 34 need not be continuously welded but may be tack welded or otherwise secured at intervals consistent with the length of the final subassembly 60. As will be appreciated by one skilled in the art, other methods of securing are feasible. This would include, for example, explosion and vacuum roll bonding and laser, plasma, tungsten-inert gas (TIG), and metal-inert gas (MIG) welding. It is contemplated, within the scope of the present invention, that other securing methods, such as engineering adhesives compatible with end-use conditions could also be used. For example, adhesives which provide high-temperature resistance, such as polyimides could be used. The process, as noted above, is also easily adapted for plastics, ceramics, and other materials of construction. For example, plastics, including, for example, depending upon the application, polypropylene, polysulfone, polyphenolene sulfide, and polyimide, could be secured, following alignment, with a number of well-known methods, which include, by way of example only, adhesives and hot plate, solvent, and ultrasonic welding. Ceramics could be aligned, for example while in a green state and secured while green or following curing.

Figure 2:
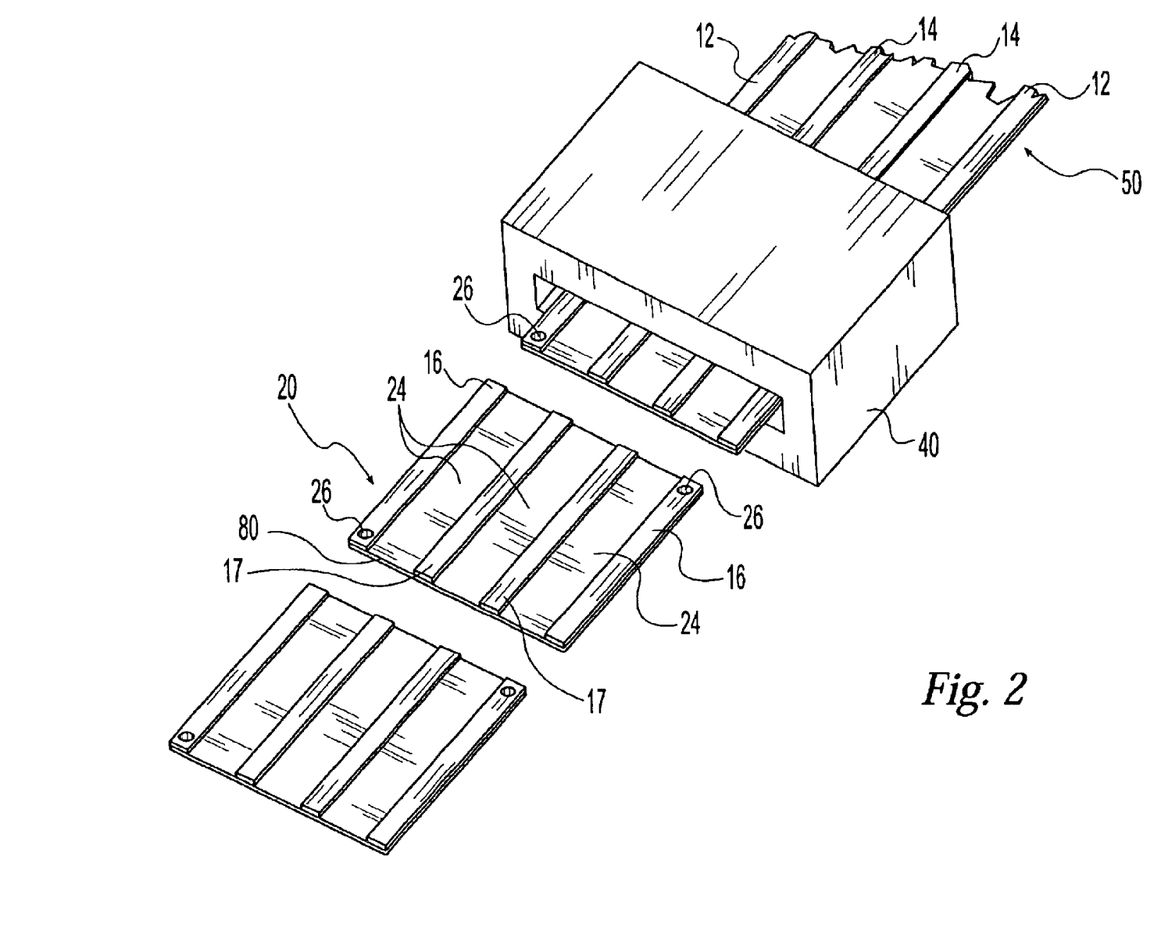
FIG. 2 is a perspective view of the cutting aspect of a preferred embodiment of the present invention.

As shown in FIGS. 1 and 2, in a preferred embodiment, the partial laminate 50 next enters a cutting module 40. Therein, the partial laminate 50 is sheared or otherwise cut to length. While other methods, sawing, for example, may be utilized, shearing is preferred for high-speed fabricating processes. One or more alignment holes 26 may be formed to assist in aligning the subassemblies 10, 20, 60 when they are stacked together (see FIGS. 6 and 7). Preferably, two alignment holes 26 are formed and at diagonal corners. Notably, each of two alignment holes need not be similarly positioned but one may be offset to facilitate assembly Subsequently, during stacking (FIGS. 6 and 7), the alignment holes 26 would be threaded over alignment fingers or other similar devices (not shown). As will be appreciated by one skilled in the art, other methods of alignment may be utilized. For example, FIG. 3 shows alignment nipples 28 which would cooperate with a matching indentation on an opposite surface of an adjacent base (not shown), FIG. 4 shows alignment tabs which would be utilized during stacking in combination with guides or similar devices (not shown), and FIG. 5 shows alignment notches which would also be utilized during stacking (see FIGS. 6 and 7) in cooperation with mating alignment features in assembly fixturing.

As a result of the previous steps, multiple subassemblies 10, 20, 60 have been fabricated to the desired design, lengths and widths of the various channels 24 have been formed, and any additional strips 14 and/or support members 34 have been added as desired.

Figures 6, 7:
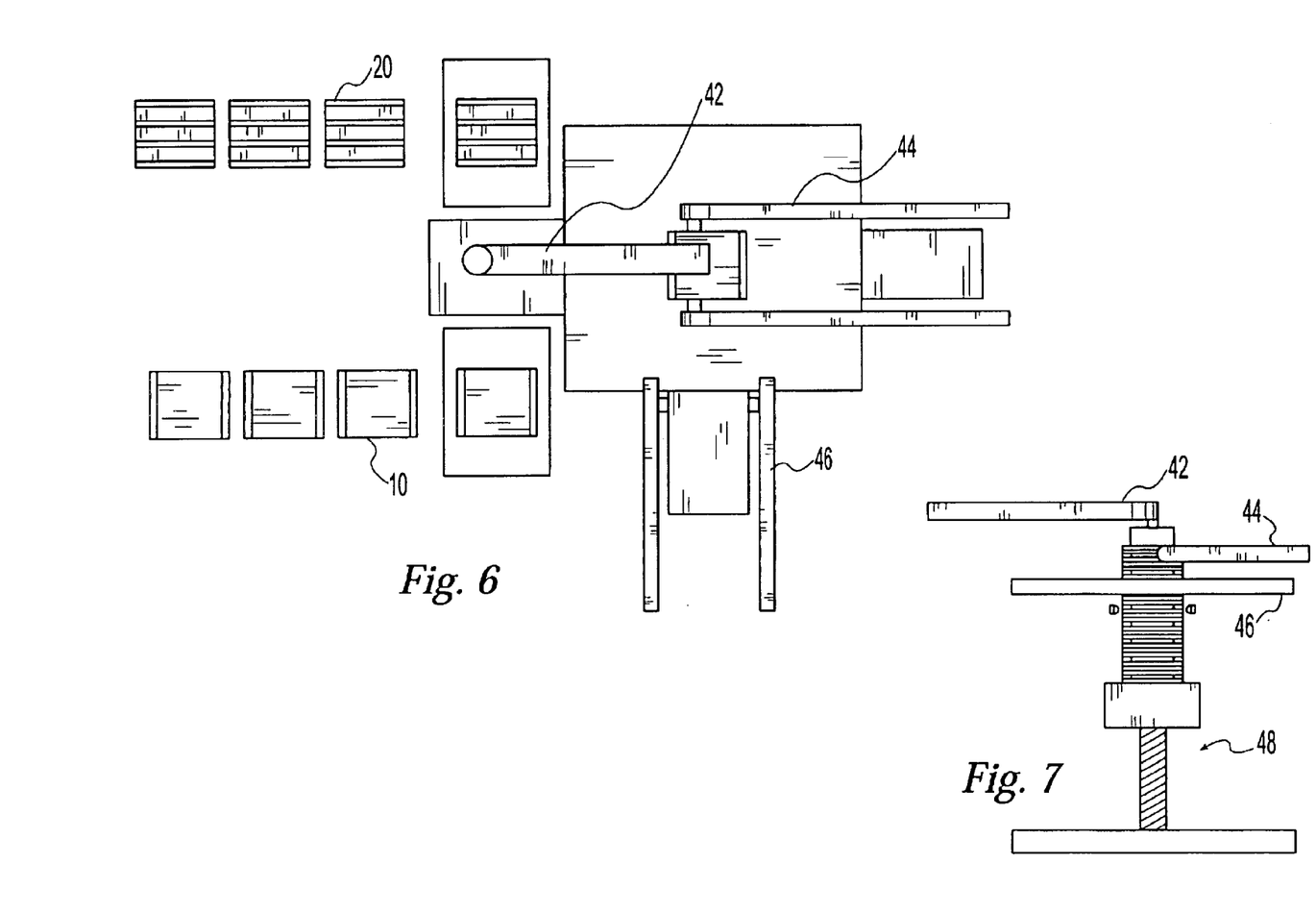
FIG. 6 is a plan view of the stacking and edge securing aspects of the present invention.
FIG. 7 is an elevation view of the stacking and edge securing aspect of the present invention shown in plan view in FIG. 6.

As shown in FIGS. 6 and 7, a stack 100 is formed using, for example, a pick-place-and-weld module 42. The desired subassemblies 10, 20, 60 are fed to the pick-place-and-weld module 42 and sequentially stacked together, assisted, preferably, by the alignment holes 26, nipples 28, tabs 30, or notches 32. Following stacking, a first welder 44 and preferably a second welder 46, each consisting preferably of two arms, weld the subassemblies 10, 20, 60 together to form a complete unit 100 (shown in FIG. 8). An index mechanism 48 lowers the stack in increments to align with the welders 44, 46.

FIG. 8 shows an example of a completed stack 100 along with inlet and outlet headers/manifolds 110. As illustrated in FIG. 8, edge strips 16 have been joined to a respective base plate 80 by, for example, a continuous resistance seam weld 52. In addition, a plurality of subassemblies 20, 40, 60 have been joined by, for example, a laser edge weld 54. As discussed herein, and as will be appreciated by those skilled in the art, other welding methods and even other joining methods may be employed with the scope and spirit of the present invention. Headers/manifolds 110 are added to distribute fluid flow and may be attached to the stack by known methods. For proper flow distribution, each header 110 may be tapered or otherwise designed with a varying cross-sectional area, such as, for example, a parabolic surface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A method of fabricating a multi-channel device, the method comprising the steps of:
   (a) fabricating a partial laminate, the fabrication of the partial laminate comprising the steps of:
      (i) providing a base web, the base web having a first edge and a second edge, the second edge opposite from, and substantially parallel to, the first edge, and a first surface;
      (ii) providing a first edge web;
      (iii) providing a second edge web;
      (iv) optionally providing one or more additional webs;
      (v) aligning the first edge web with the first edge of the base web;
      (vi) contacting the first edge web with the first surface of the base web;
      (vii) aligning the second edge web with the second edge of the base web;
      (viii) contacting the second edge web with the first surface of the base web;
      (ix) aligning any optional additional webs between the first edge web and the second edge web;
      (x) contacting any optional additional webs with the first surface of the base web;
      (xi) securing the edge webs and any optional additional webs to the first surface of the base web, thus defining one or more open partial laminate channels, the one or more open partial laminate channels running substantially parallel to at least the first base web edge;
   (b) separating the partial laminate into a plurality of subassemblies, each subassembly comprising a base, a first edge strip, a second edge strip, and optionally one or more additional strips, the base, the first edge strip, the second edge strip, and any optional additional strips defining one or more subassembly open channels, each subassembly base having a first edge, the first subassembly base edge being substantially orthogonal to the one or more subassembly open channels, and a second edge, the second subassembly base edge opposite from and substantially parallel to the first subassembly base edge;
   (c) placing one or more additional subassemblies together with a first subassembly to form a partial stack, such that the base of each additional subassembly cooperates with an adjacent subassembly to form one or more closed channels, wherein the one or more channels of at least one subassembly are substantially orthogonal to the one or more channels of at least one other subassembly;
   (d) terminating the partial stack with a final plate, the final plate having a first edge and a second edge, the final plate second edge opposite from and substantially parallel to the final plate first edge, wherein the final plate cooperates with an adjacent additional subassembly to define one or more closed channels;
   (e) securing the first edge of at least one additional subassembly to the first edge strip of an adjacent subassembly;
   (f) securing the second edge of the at least one additional subassembly to the second edge strip of the adjacent subassembly;
   (g) securing the final plate first edge to the first edge strip of the adjacent subassembly; and
   (h) securing the final plate second edge to the second edge strip of the adjacent subassembly.

2. The method of claim 1, wherein at least the first edge web is secured to the base web using continuous seam resistance welding.

3. The method of claim 1, wherein at least the first edge web is secured to the base web using an adhesive.

4. The method of claim 1, wherein at least the first edge web is secured to the base web using a method chosen from the list consisting of explosion bonding, vacuum roll bonding, laser welding, plasma welding, TIG welding, and MIG welding.

5. The method of claim 1, wherein at least one of any optional additional webs are secured to the base web using continuous seam resistance welding.

6. The method of claim 1, wherein the optional one or more additional webs are secured to the base web using an adhesive.

7. The method of claim 1, wherein the optional one or more additional webs are secured to the base web using a method chosen from the list consisting of explosion bonding, vacuum roll bonding, laser welding, plasma welding, TIG welding, and MIG welding.

8. The method of claim 1, further comprising the step of forming at least one alignment means for each subassembly.

9. The method of claim 8, wherein the at least one alignment means is an aperture.

10. The method of claim 8, wherein the at least one alignment means is a tab.

11. The method of claim 8, wherein the at least one alignment means is a notch.

12. The method of claim 8, wherein the at least one alignment means comprises a nipple cooperating with a depression.

13. The method of claim 8, further comprising the step of aligning each subassembly with at least one adjacent subassembly using the at least one alignment means.

14. The method of claim 1, further comprising steps of:
   (a) aligning one or more support members within the open partial laminate channel;
   (b) contacting the one or more support members with the first surface of the base web; and
   (c) securing the one or more support members to the base web.

15. The method of claim 14, wherein the one or more support members are secured to the base web by tack welding.

16. The method of claim 1, further comprising the step of securing a first header to a first side of the stack.

17. A method of fabricating a multi-channel device, the method comprising the steps of:
   (a) fabricating a first partial laminate, the fabrication of the first partial laminate comprising the steps of:
      (i) providing a first partial laminate base web, the first partial laminate base web having a first edge and a second edge, the second edge opposite from, and substantially parallel to, the first edge, and a first surface;

(ii) providing a first partial laminate first edge web;

(iii) providing a first partial laminate second edge web;

(iv) optionally providing one or more first partial laminate additional webs;

(v) aligning the first partial laminate first edge web with the first edge of the first partial laminate base web;

(vi) contacting the first partial laminate first edge web with the first surface of the first partial laminate base web;

(vii) aligning the first partial laminate second edge web with the second edge of the first partial laminate base web;

(viii) contacting the first partial laminate second edge web with the first surface of the first partial laminate base web;

(ix) aligning any optional first partial laminate additional webs between the first partial laminate first edge web and the first partial laminate second edge web;

(x) contacting any optional first partial laminate additional webs with the first surface of the first base web;

(xi) securing the first partial laminate first edge web, the first partial laminate second edge web, and any optional first partial laminate additional webs to the first partial laminate base web, thus defining one or more open first partial laminate channels, the one or more open first partial laminate channels running substantially parallel to at least the first edge of the first partial laminate base web;

(b) separating the first partial laminate into a plurality of first subassemblies, each first subassembly comprising a first subassembly base, a first subassembly first edge strip, a first subassembly second edge strip, and optionally one or more first subassembly additional strips, the first subassembly base, the first subassembly first edge strip, the first subassembly second edge strip, and any optional first subassembly additional strips defining one or more first subassembly open channels, each first subassembly further having a first subassembly first edge, the first subassembly first edge running substantially orthogonal to the first subassembly one or more open channels, and a first subassembly second edge, the first subassembly second edge opposite from and substantially parallel to the first subassembly first edge;

(c) fabricating at least a second partial laminate, the fabrication of the second partial laminate comprising the steps of:

(i) providing a second partial laminate base web, the second partial laminate base web having a first edge and a second edge, the second edge opposite from, and substantially parallel to, the first edge, and a first surface;

(ii) providing a second partial laminate first edge web;

(iii) providing a second partial laminate second edge web;

(iv) optionally providing one or more second partial laminate additional webs;

(v) aligning the second partial laminate first edge web with the, first edge of the second partial laminate base web;

(vi) contacting the second partial laminate first edge web with the first surface of the second partial laminate base web;

(vii) aligning the second partial laminate second edge web with the second edge of the second partial laminate base web;

(viii) contacting the second partial laminate second edge web with the first surface of the second partial laminate base web;

(ix) aligning any optional second partial laminate additional webs between the second partial laminate first edge web and the second partial laminate second edge web;

(x) contacting any optional second partial laminate additional webs with the first surface of the second base web;

(xi) securing the second partial laminate first edge web, the second partial laminate second edge web, and any optional second partial laminate additional webs to the second partial laminate base web, thus defining one or more open second partial laminate channels, the one or more open second partial laminate channels running substantially parallel to at least the first edge of the second partial laminate base web;

(d) separating the second partial laminate into a plurality of second subassemblies, each second subassembly comprising a second subassembly base, a second subassembly first edge strip, a second subassembly second edge strip, and optionally one or more second subassembly additional strips, the second subassembly base, the second subassembly first edge strip, the second subassembly second edge strip, and any optional second subassembly additional strips defining one or more second subassembly open channels, each second subassembly further having a second subassembly first edge, the second subassembly first edge running substantially orthogonal to the second subassembly one or more open channels, and a second subassembly second edge, the second subassembly second edge opposite from and substantially parallel to the second subassembly first edge;

(e) placing one or more first subassemblies and one or more second subassemblies together such that:

(i) the base of one subassembly cooperates with an adjacent subassembly to form at least one closed channel;

(ii) at least one first subassembly is adjacent to at least one second subassembly; and (iii) the at least one first subassembly channel is substantially orthogonal to the at least one second subassembly channel;

(f) terminating the stack with a final plate, the final plate having a first edge and a second edge, the final plate second edge opposite from and substantially parallel to the final plate first edge, wherein the final plate cooperates with an adjacent subassembly to define a closed channel;

(g) securing the final plate to an adjacent subassembly; and (h) securing each subassembly to at least one adjacent subassembly.

18. A multi-channel device, the device comprising:

a stack of a plurality of adjacent subassemblies, each subassembly comprising:

a base, the base having a surface, a first edge, and a second edge, the second edge being substantially parallel to, and spaced apart from, the first edge;

a first edge strip secured to the surface of the base substantially along the first edge;

a second edge strip secured to the surface of the base substantially along the second edge, wherein a channel is defined between the first edge strip and the second edge strip;

optionally, one or more additional strips, wherein the one or more optional additional strips, the base, the first edge strip, and the second edge strip cooperate to define two or more channels;

one or more support members, wherein the one or more support members lie within at least one channel;

wherein the base of at least one subassembly is secured to an adjacent subassembly and cooperates with the first edge strip, the second edge strip, and the base of the adjacent subassembly to form at least one closed channel and wherein the at least one channel of at least one subassembly runs substantially orthogonal to the at least one channel of an adjacent subassembly; and a termination plate, the termination plate secured to an adjacent subassembly and cooperating with the first edge strip, the second edge strip, and the base of the adjacent subassembly to form at least one closed channel.

19. The multi-channel device of claim 18, further comprising at least a first header secured to a first side of the stack.

20. The multi-channel device of claim 19, wherein the at least first header has a tapered cross-section.

21. The multi-channel device of claim 19, wherein the at least first header has a parabolic cross-section.

* * * * *